(No Model.) P. WINSOR & A. WURTS. 2 Sheets—Sheet 1.
LIGHTNING ARRESTER.

No. 417,694. Patented Dec. 17, 1889.

Witnesses
George Brown Jr.
James H. Smith

Inventors
Paul Winsor
Alexander Wurts
By their Attorney
Charles A. Terry (No Model.) 2 Sheets—Sheet 2.
P. WINSOR & A. WURTS.
LIGHTNING ARRESTER.
No. 417,694. Patented Dec. 17, 1889.
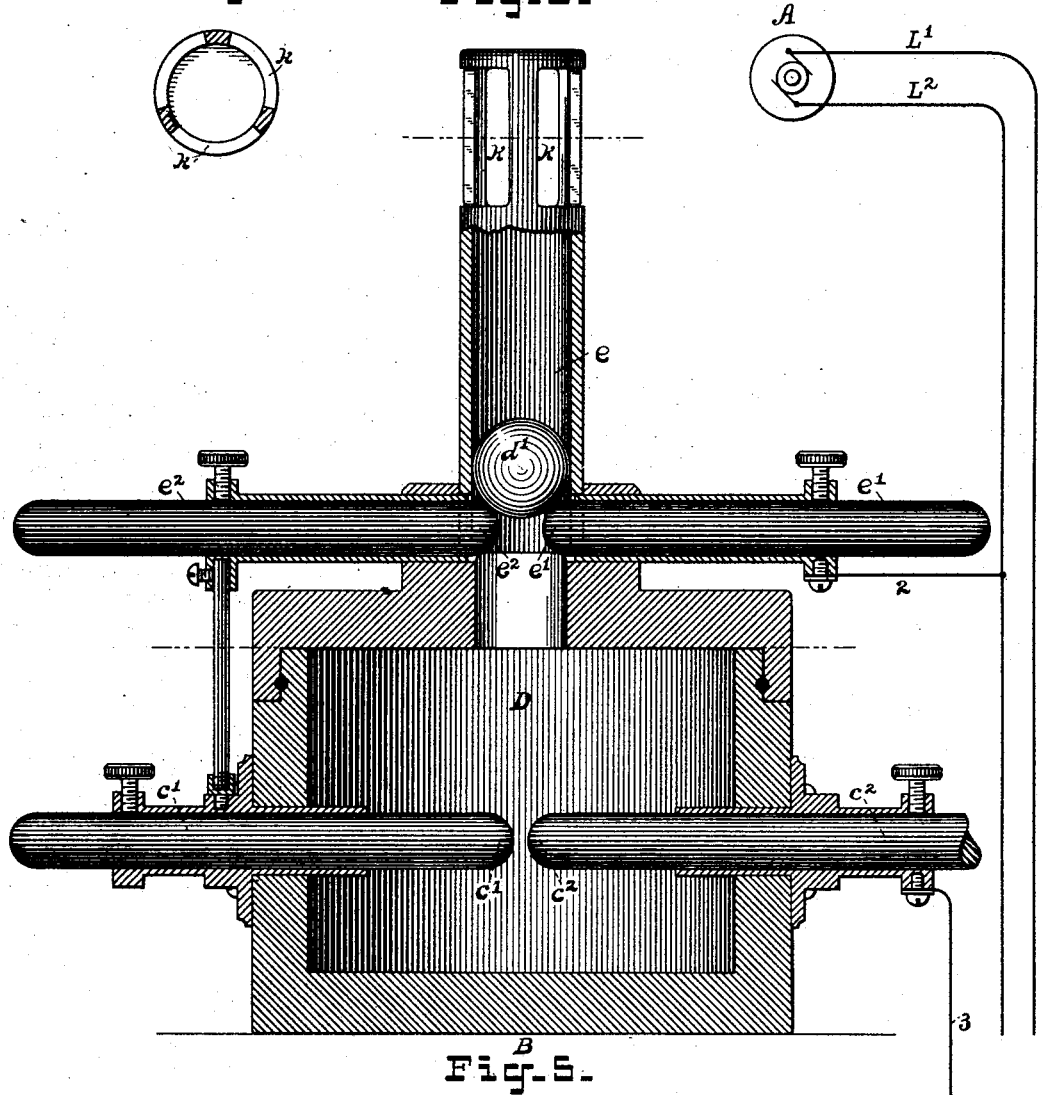
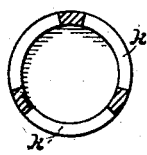
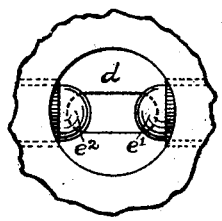
Witnesses
George Brown Jr.
James W. Smith
Inventor
Paul Winsor
Alexander Wurts
By their Attorney
Charles A. Terry

UNITED STATES PATENT OFFICE.

PAUL WINSOR AND ALEXANDER WURTS, OF PITTSBURG, PENNSYLVANIA, ASSIGNORS TO THE WESTINGHOUSE ELECTRIC COMPANY, OF SAME PLACE.

LIGHTNING-ARRESTER.

SPECIFICATION forming part of Letters Patent No. 417,694, dated December 17, 1889.

Application filed September 25, 1889. Serial No. 325,018. (No model.)

*To all whom it may concern:*

Be it known that we, PAUL WINSOR and ALEXANDER WURTS, citizens of the United States, residing in Pittsburg, in the county of Allegheny and State of Pennsylvania, have invented a certain new and useful Improvement in Lightning-Arresters, (Case No. 353,) of which the following is a specification.

The invention relates to a method of and the construction of apparatus for protecting circuits from injury incident to or resulting from lightning-discharges.

When the circuit of an electric generator receives a lightning-stroke and a discharge takes place to the earth through a lightning-arrester of the usual construction, an arc is established across which the generated current is liable to flow, the generator being thus short-circuited. It becomes desirable, therefore, to provide means for interrupting the flow of current through such a circuit immediately after the lightning-discharge has taken place.

The special object of this invention is to cause the circuit through which the lightning-discharge has taken place to be interrupted or so acted upon as to interrupt the flow of the current from the generator after the lightning has escaped to the earth. It is also desirable that the apparatus should be so organized as to allow repeated lightning-discharges to take place to the earth without its requiring to be reset or readjusted by hand.

The invention may be described, in general terms, as consisting of one or more pairs of discharge points or plates placed in such relation to each other and to the circuit to be protected that the lightning-discharge will pass across the intervening space to the earth and cause such an expansion of the air or a gas or fluid within an inclosing-chamber as to either directly or indirectly interrupt the flow of current through the circuit.

There are many different ways of carrying the invention into practice; but those shown in the accompanying drawings will serve to illustrate its application.

Figure 1:
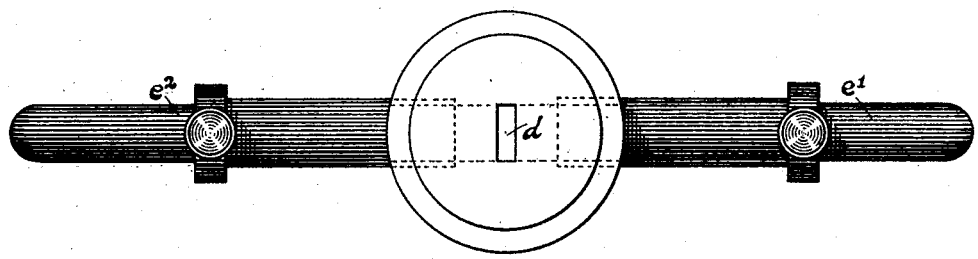
Figure 2:
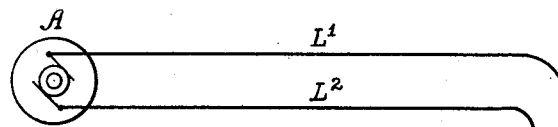
Figure 2:
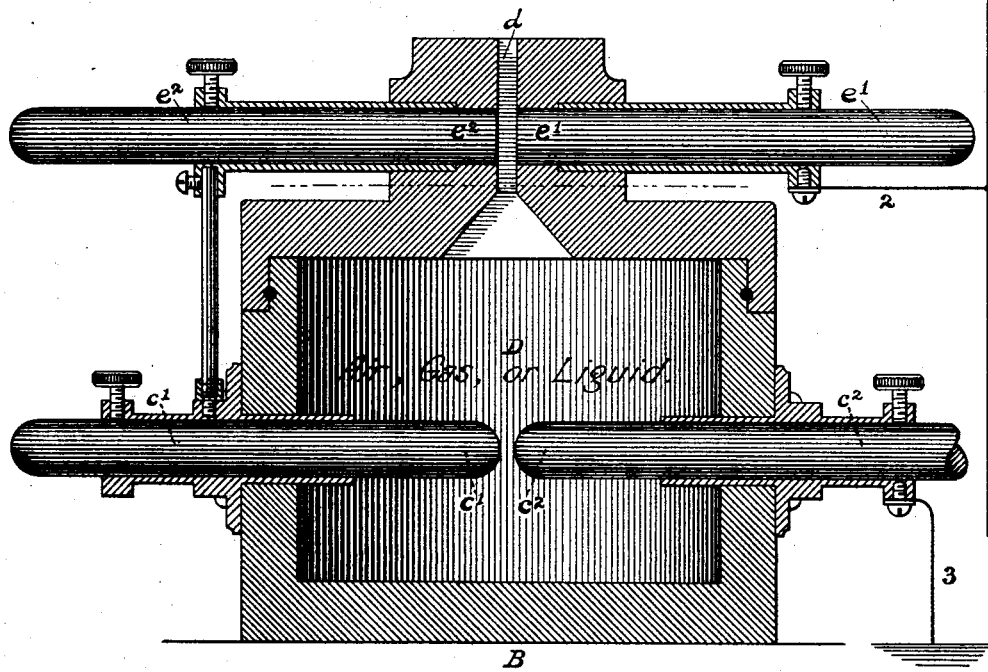

Figure 1 is a plan of a portion of one form of the device. Fig. 2 is a vertical section of the same. Figs. 3, 4, and 5 illustrate a modification.

Referring to the figures, A represents a suitable source of electric currents, and $L'$ $L^2$ main-line conductors leading therefrom or connected therewith. A conductor 2 leads from the conductor $L^2$ to the lightning-discharge device or arrester B. This device is constructed as follows: Two confronting plates or points $c'$ $c^2$ are separated from each other by the required intervening space. These points are placed within an inclosing-chamber D of suitable size. The chamber may be of circular or other convenient form. It is provided with an opening $d$, which is here shown at the top. This opening consists of a narrow slot, and in it two confronting electrodes $e'$ $e^2$ are placed.

The circuit-connections are as follows: The conductor 2 is connected with the point or plate $e'$. The plate $e^2$ is connected with the plate $c'$, and the plate $c^2$ is connected by the conductor 3 with the earth. When a lightning-discharge takes place across the plates $c'$ $c^2$, it must also form an arc at the plates $e'$ and $e^2$. The effect of the formation of an arc between the plates $c'$ and $c^2$ is to produce an expansion of the air or gas within the chamber and create a tendency for it to rush outward from the chamber. The sudden rush of air through the opening $d$, in which the points $e'$ and $e^2$ are placed, will interrupt the flow of current at this point, and thus the entire circuit will be interrupted by the extinguishment of the arc at $e'$ $e^2$. The heat developed at the points $e'$ $e^2$ may aid in the expansion of the gas. In this organization it is desirable that the opening $d$ should be of such shape that the escaping air must pass for the most part between the electrodes or points $e'$ $e^2$. The degree of separation of the sets of points is determined by the conditions to be subserved.

In the modification shown in Figs. 3, 4, and 5 a tube $e$ leads from the opening $d$ and constitutes a continuation thereof. The end of the tube may be closed and openings made through its wall at the upper end, as shown at $k$ $k$. At some suitable point within the tube, or at the mouth of the opening $d$, the two electrodes or contact plates or points $e'$ $e^2$ are placed. These are separated from each other, but are normally electrically connected by a block or spherical valve $d'$, as shown. This block or ball is of such size as to more or less completely close the opening $d$ when at rest upon the points.

The air or gas in the chamber D will be expanded by the heat developed at the points $c'$ $c^2$, as before, and it will escape through the opening $d$. This forces the contact block or ball away from the plates $e'$ $e^2$, thus interrupting the circuit-connections. The tube may be so constructed that the ball will return to its former position after the circuit-connections have thus been interrupted and the flow of current from the dynamo has ceased. In this construction it will be noticed that at the same time that the ball is raised from the points $e'$ $e^2$ the rush of air between the points takes place, thus preventing the formation of an arc at these points. The ball thus serves to break the circuit without forming an arc. The separation of the points $e'$ $e^2$ may be greater in this construction than that shown in Figs. 1 and 2, if desired. The connections having once been interrupted and the arc destroyed, there will be little or no danger of its being re-established except by means of another lightning-discharge. The apparatus will thus automatically readjust itself for repeated lightning-discharges.

In practice the discharge plates or points $c'$ $c^2$ and $e'$ $e^2$ are preferably of carbon or some material not easily destroyed by heat. Carbon rods are well adapted to the purpose. The ball $d'$ may also be of carbon.

Many other mechanical devices may be used for carrying the invention into effect; but that which we have here described will serve to illustrate the application of the invention and its operation.

In some instances it may be desired to employ a liquid having a low degree of conductivity, instead of air or gas, in the chamber D. The explosion caused by the arc will expand or decompose the fluid and effect the result desired.

It will be understood that a second lightning-discharge device of similar construction may be applied to the line $L'$ upon the other side of the generator, and, in general, that they may be located at such points as desired.

In an application filed by one of us—namely, Paul Winsor—November 4, 1889, Serial No. 329,149, there is described and claimed an apparatus wherein the heat causing the expansion is developed by reason of an arc formed between the discharge-plates located within or near the opening, the expanded medium being forced through the arc which occasions the expansion.

We claim as our invention—

1. A lightning-discharge device consisting of two sets of discharge-plates connected in series and a chamber inclosing one of said sets having an opening in which the second set is located.

2. The combination of a normally-open electric circuit, discharge-plates included therein, an inclosing-chamber for the same having a passage or opening through its wall, and a circuit-interrupting device located in said passage.

3. The combination of discharge-plates, an inclosing-chamber for the same having a passage or opening through its wall, and a circuit-interrupting device located in said passage, consisting of a contact device in circuit with said plates and responding to the flow of air through said passage to interrupt said circuit.

4. A lightning-discharge device consisting of discharge-plates, an inclosing-chamber having an opening, and a circuit-controlling device normally closing said opening, and through which the circuit-connections with said discharge-plates are normally complete.

5. A lightning-discharge device consisting of discharge-points, an inclosing-chamber for the same, and a pneumatic circuit-interrupter in series with the discharge-points operated by the expansion of air or gas within said chamber.

6. The hereinbefore-described method of protecting an electric circuit from abnormal currents, which consists in causing an arc to be formed across a normally-open space by abnormal currents, and in causing by such arc a sudden expansion of air or gas and in opening the circuit leading to such arc by the consequent rush of air or gas.

7. The hereinbefore-described method of automatically establishing and interrupting the flow of current, which consists in establishing an arc in a normally-interrupted circuit, causing the heat developed by such an arc to produce an expansion of the surrounding air or gas, causing it to rush in a given direction, and in interrupting the flow of current through the circuit, maintaining the arc at a point other than at the arc by such rush of air or gas.

8. The hereinbefore-described method of protecting an electric circuit from injury from lightning-discharges, which consists in causing the lightning-discharges to reach the earth by forming an arc through an expansible medium, causing such medium to be expanded by the heat developed by the electric current traversing it, and interrupting the flow of current at a point other than at the arc by the rush of the expanded medium from the arc.

In testimony whereof we have hereunto subscribed our names this 23d day of September, A. D. 1889.

PAUL WINSOR.
ALEXANDER WURTS.

Witnesses:
JOHN F. MILLER,
CHARLES A. TERRY.